United States Patent
Nicholson et al.

(10) Patent No.: US 7,512,766 B2
(45) Date of Patent: *Mar. 31, 2009

(54) CONTROLLING PREEMPTIVE WORK BALANCING IN DATA STORAGE

(75) Inventors: Robert B. Nicholson, Southsea (GB); Carlos F. Fuente, Portsmouth (GB); Stephen P. Legg, Southampton (GB)

(73) Assignee: International Business Machines Corporation, Armonk, NY (US)

(*) Notice: Subject to any disclaimer, the term of this patent is extended or adjusted under 35 U.S.C. 154(b) by 279 days.

This patent is subject to a terminal disclaimer.

(21) Appl. No.: 11/213,494

(22) Filed: Aug. 27, 2005

(65) Prior Publication Data
US 2006/0053251 A1    Mar. 9, 2006

(30) Foreign Application Priority Data
Sep. 3, 2004    (GB)    ................... 0419599.6

(51) Int. Cl.
*G06F 12/00* (2006.01)
*G06F 13/00* (2006.01)
*G06F 13/28* (2006.01)
*G06F 9/46* (2006.01)
*G06F 3/00* (2006.01)
*G06F 5/00* (2006.01)

(52) U.S. Cl. .................. 711/170; 711/165; 711/168; 718/105; 710/18; 710/29; 710/58; 710/60

(58) Field of Classification Search .................. 711/170
See application file for complete search history.

(56) References Cited

U.S. PATENT DOCUMENTS

| 5,666,512 A | * | 9/1997 | Nelson et al. ............... 711/114 |
| 6,598,174 B1 | * | 7/2003 | Parks et al. ..................... 714/6 |
| 6,990,667 B2 | * | 1/2006 | Ulrich et al. ................. 718/105 |
| 7,093,088 B1 | * | 8/2006 | Todd et al. ................... 711/162 |
| 2001/0054133 A1 | | 12/2001 | Murotani et al. |
| 2002/0091746 A1 | | 7/2002 | Umberger et al. |
| 2002/0103969 A1 | | 8/2002 | Koizumi et al. |
| 2003/0212872 A1 | | 11/2003 | Patterson et al. |

* cited by examiner

*Primary Examiner*—Kevin L Ellis
*Assistant Examiner*—Ryan Bertram
(74) *Attorney, Agent, or Firm*—Jeffrey P. Aiello

(57) ABSTRACT

A storage network control apparatus is operable to present virtualized storage to a host system and includes a monitoring component, an analysis component, a detection component, and a migration component. The monitoring component is for monitoring input/output (I/O) activity for virtual storage logical units over time. The analysis component is for identifying a repeating instance of peak I/O activity for a virtual storage logical unit over time and for generating a predictive signature therefrom. The detecting component is for identifying an instance of such a predictive signature. The migration component is responsive to the detecting component, and is for migrating data mapped by the virtual storage logical unit across additional real storage units to improve the I/O performance of the virtual storage logical unit prior to a recurrence of the repeating instance of peak I/O activity. A corresponding logic arrangement may be incorporated in hardware, software or a combination thereof.

11 Claims, 2 Drawing Sheets

CONTROLLING PREEMPTIVE WORK BALANCING IN DATA STORAGE

RELATED APPLICATIONS

The present patent application claims priority under 35 USC 119 to the previously filed United Kingdom (UK) patent application entitled "Controlling preemptive work balancing in data storage," filed on Sep. 3, 2004, and assigned serial no. 0419599.6.

FIELD OF THE INVENTION

The present invention relates generally to controlling data storage, and more particularly to controlling preemptive work balancing in such data storage.

BACKGROUND OF THE INVENTION

In a large data processing system having one or more disk storage subsystems, the workload of the disk storage subsystems usually fluctuates over time. Typically there are short-term small variations in the load expressed as input/outputs (I/Os) per second (IOPs) that are "noise-like" and thus hard to predict. Longer term, such variations may be diurnal and hebdomadal variations that are more predictable. At peak workload times the demand of the IOPs on some storage devices or some logical units within them may be so high so as to lead to long latencies for I/O operations.

One existing solution to this problem is to size the system to have a large enough capacity to cope with the peaks. However, the durations of these peak workloads may be insufficient to financially justify sizing the system capacity for them.

Another possible course of action is to detect the occurrence of a peak workload, and then do something in response. It may be possible, for example, to spread the placement of the heavily used data to a larger number of physical devices in order to exploit their I/O capability. It is well-known to those of ordinary skill in the art that striping a heavily used dataset across multiple real devices allows a larger workload to be sustained, for instance, as is known from Redundant Arrays of Independent Disks (RAID) 0 storage arrangements.

In a data processing system that has a variety of storage devices, some with higher performance than others, yet another course of action is to move, or "migrate," heavily accessed data onto the faster devices when the demand arises. This is sometimes termed "Adaptive Data Placement."

The difficulty with these latter approaches is that making a copy or moving data increases the IOPs demand just at the worst time, when demand is already too high. It would thus be more desirable to provide adaptive data placement without increasing IOPs demand at busy times. For this and other reasons, there is a need for the present invention.

SUMMARY OF THE INVENTION

The present invention relates to controlling preemptive work balancing within a data storage. A storage network control apparatus of an embodiment of the invention is operable to present virtualized storage to a host system and includes a monitoring component, an analysis component, a detecting component, and a migration component. The monitoring component is for monitoring input/output (I/O) activity for virtual storage logical units over time. The analysis component is for identifying a repeating instance of peak I/O activity for a virtual storage logical unit over time and for generating a predictive signature therefrom. The detecting component is for identifying an instance of the predictive signature. The migration component is responsive to the detecting component, and is for migrating data mapped by the virtual storage logical unit across additional real storage units to improve the I/O performance of the virtual storage logical unit prior to a recurrence of the repeating instance of peak I/O activity.

The apparatus can in one embodiment also include a recording component to maintain a record of the types of workload patterns on virtual storage logical units that immediately precede a repeating instance of peak I/O activity. The additional real storage units may be selected for fast performance. The apparatus can also include a recording component to maintain a record of the types of workload patterns on virtual storage logical units that immediately precede the completion of a repeating instance of peak I/O activity. The apparatus may further include another data migration component for migrating the data mapped by the virtual storage logical unit from the additional real storage after completion of the recurrence of the repeating instance of peak I/O activity.

The data that had been migrated may be migrated back to its original placement in anticipation of the completion of the recurrence of the repeating instance of peak I/O activity. The data that had been migrated may be migrated back to its original placement following the completion of the recurrence of the repeating instance of peak I/O activity. In one embodiment, following the completion of the workload peak the data that had been migrated is only migrated back to its original placement as a result of being displaced by other data that has a high workload peak.

Furthermore, following the completion of the recurrence of the repeating instance of peak I/O activity, the data that had been migrated may be migrated back to its original placement based on a policy that is defined for the storage network control apparatus. For instance, following the completion of the recurrence of the repeating instance of peak I/O activity, the data that had been migrated may be migrated back to its original placement based on a policy that is defined for the complete storage network. Following the completion of the recurrence of the repeating instance of peak I/O activity, the data that had been migrated may alternatively be migrated back to its original placement based on a policy that is defined for the host system.

A data processing system of an embodiment of the invention includes a host computer and a storage network control apparatus that is operable to present virtualized storage to the host computer. The storage network control apparatus includes a monitoring component, an analysis component, a detecting component, and a migration component. The monitoring component is for monitoring input/output (I/O) activity for virtual storage logical units over time. The analysis component is for identifying a repeating instance of peak I/O activity for a virtual storage logical unit over time and for generating a predictive signature therefrom. The detecting component is for identifying an instance of the predictive signature. The migration component is responsive to the detecting component, and is for migrating data mapped by the virtual storage logical unit across additional real storage units to improve the I/O performance of the virtual storage logical unit prior to a recurrence of the repeating instance of peak I/O activity.

A method of an embodiment of the invention is for operating a storage network control apparatus operable to present virtualized storage to a host system. The method monitors I/O activity for virtual storage logical units over time, and identifies a repeating instance of peak I/O activity for a virtual storage logical unit over time and for generating a predictive signature therefrom. The method further identifies an instance of the predictive signature, and in response migrates data mapped by the virtual storage logical unit across additional real storage units to improve the I/O performance of the virtual storage logical unit prior to a recurrence of the repeating instance of peak I/O activity.

The method may further include maintaining a record of the types of workload patterns on virtual storage logical units that immediately precede a repeating instance of peak I/O activity. The additional real storage units may be selected for fast performance. The method may also include maintaining a record of the types of workload patterns on virtual storage logical units that immediately precede the completion of a repeating instance of peak I/O activity, and/or migrating the data mapped by the virtual storage logical unit from the additional real storage units after completion of the recurrence of the repeating instance of peak I/O activity.

The data that had been migrated can be migrated back to its original placement in anticipation of the completion of the recurrence of the repeating instance of peak I/O activity. The data that had been migrated can also be migrated back to its original placement following the completion of the recurrence of the repeating instance of peak I/O activity. Following the completion of the workload peak the data that had been migrated may only be migrated back to its original placement as a result of being displaced by other data that has a high workload peak. Following the completion of the recurrence of the repeating instance of peak I/O activity, the data that had been migrated may further be migrated back to its original placement based on a policy, such as one that is defined for the storage network control apparatus, one that is defined for the complete storage network, or one that is defined for the host system. The storage network control apparatus comprises a storage area network virtualization controller.

An article of manufacture of an embodiment of the invention includes a computer-readable medium and means in the medium. The computer-readable medium may be a recordable data storage medium, a modulated carrier signal, or another type of computer-readable medium. The means is for monitoring I/O activity for virtual storage logical units over time, for identifying a repeating instance of peak I/O activity for a virtual storage logical unit over time, and for generating a predictive signature therefrom. The means is further for identifying an instance of the predictive signature, and for migrating data mapped by the virtual storage logical unit across additional real storage units to improve the I/O performance of the virtual storage logical unit prior to a recurrence of the repeating instance of peak I/O activity Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
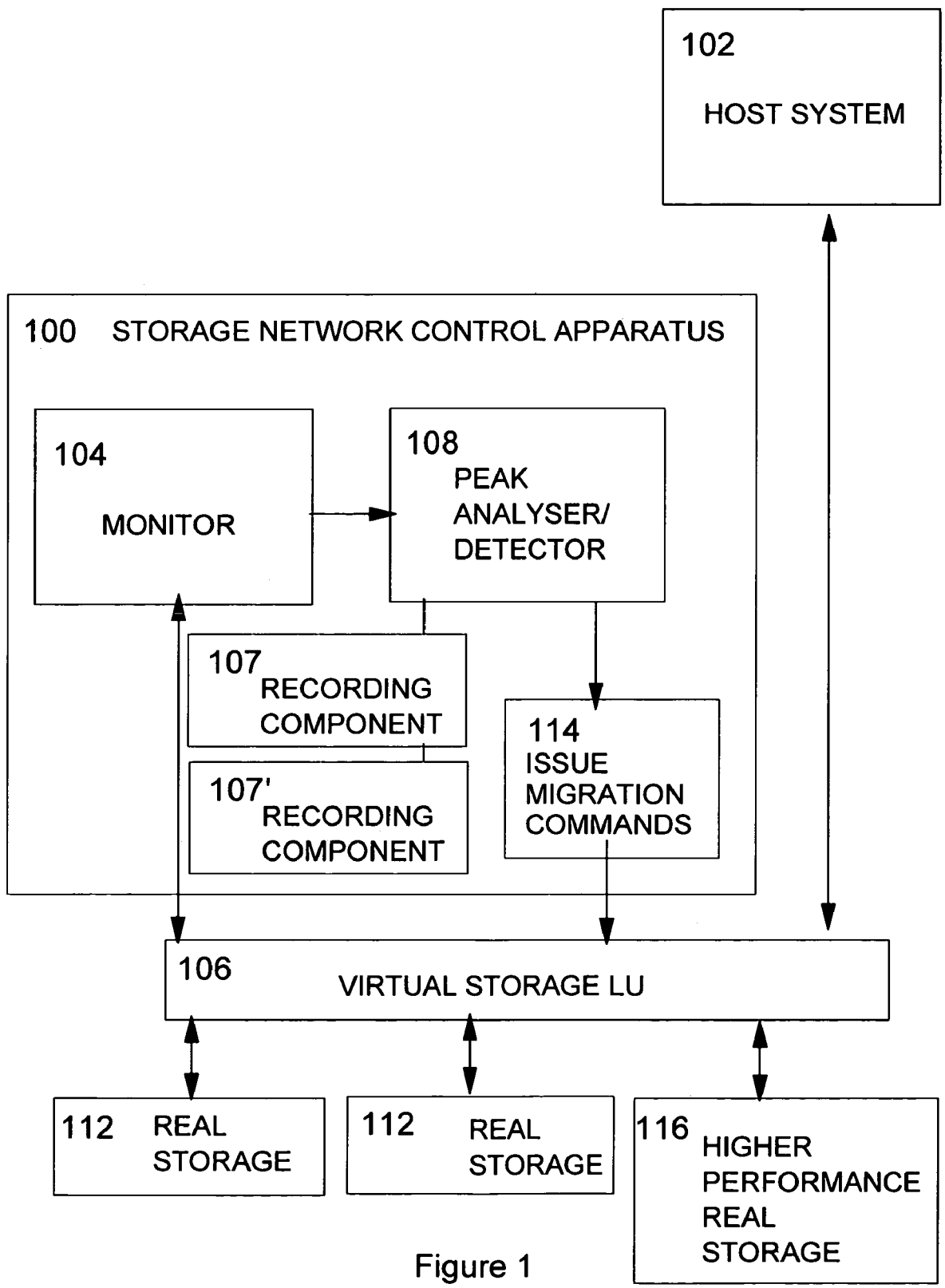
FIG. 1 shows in schematic form one arrangement of apparatus in which an embodiment of the present invention may be implemented.

Turning to FIG. 1, there is shown in schematic form one arrangement of apparatus in which an embodiment of the present invention may be implemented. Storage network control apparatus 100 is operable to control the operation of virtualized storage to a host system 102 and includes a monitoring component 104 for monitoring I/O activity for virtual storage logical units 106 over time. Storage network control apparatus 100 further includes an analysis/detector component 108 for identifying a repeating instance of "dense" or peak I/O activity for a virtual storage logical unit 106 over time and a command-issuing component 114 for building the necessary commands to instruct the virtual storage logical unit 106.

It will be clear to one of ordinary skill in the art that the analysis and detector elements may be separated. However, in one embodiment, these elements are combined into a single entity: analysis/detector component 108. Storage network control apparatus 100 may further include one or more recording components (107, 107') for recording the monitoring and analysis results in the form of patterns that may indicate the imminent occurrence of a repeating instance of peak I/O activity. Analysis/detector component 108, having identified the typical pattern or signature that precedes the occurrence of a repeating instance of peak I/O activity, signals to command component 114 that a migration of the affected data to a higher performance real storage device such as 116 is required.

The migration of data from one real storage device to another while maintaining an unchanged presentation of a given virtual storage device is a capability of a storage virtualization component such as 106, and thus provides a convenient way to implement a cooperating arrangement to respond to the detection of a peak, by analysis/detector component 108, by causing command issuing component 114 to issue one or more commands to migrate the data. At some appropriate time after the peak of activity has passed, command component 114 may issue an appropriate command to migrate the data back to the original real storage unit 112, while access continues as normal via the virtual storage LU 106.

Figure 2:
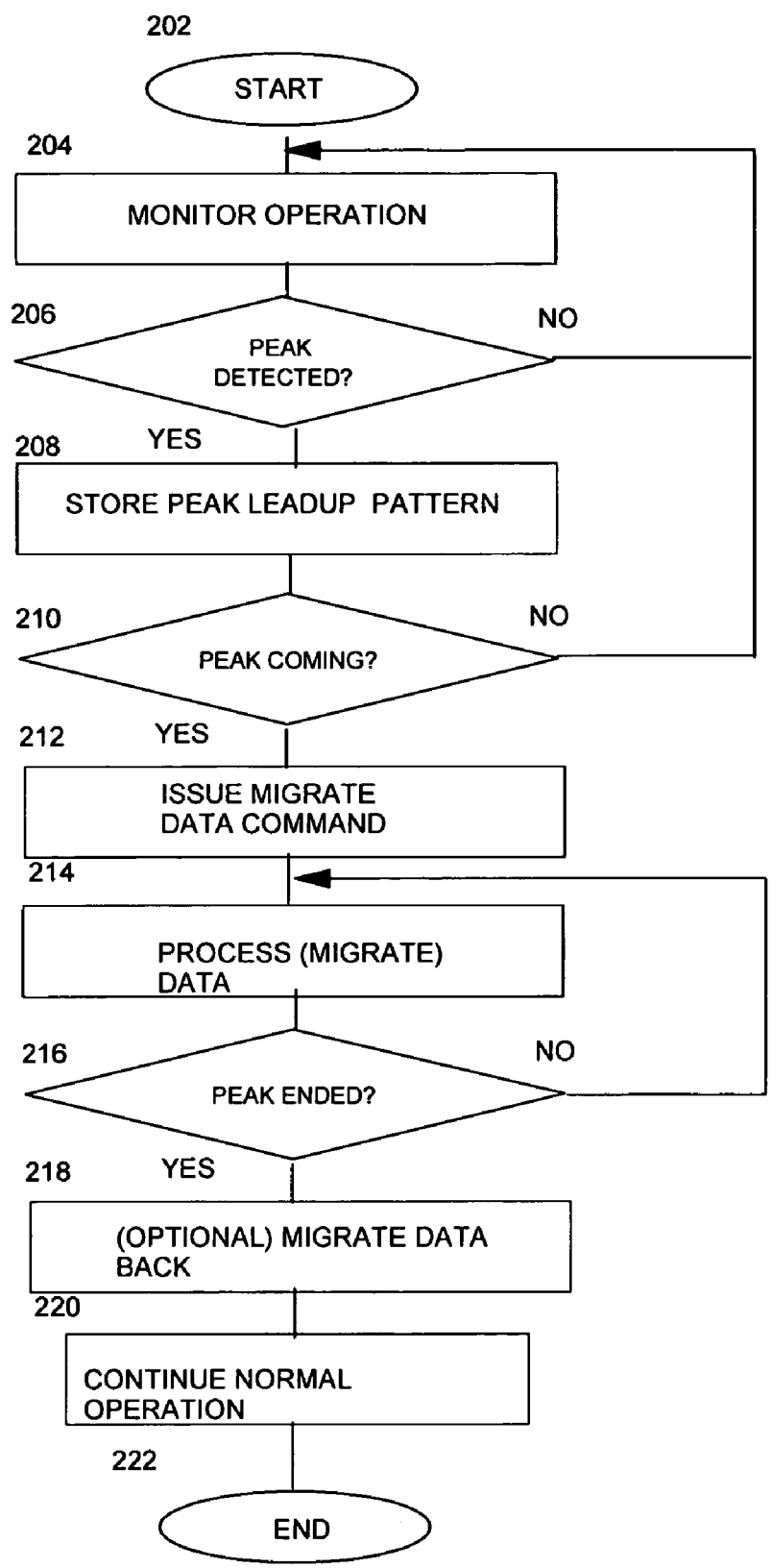
FIG. 2 shows in flowchart form one logic arrangement in which an embodiment of the present invention may be implemented.

Turning to FIG. 2, there is shown in flowchart form one logic arrangement in which an embodiment of the present invention may be implemented. At 202, the operation of the logic arrangement starts, and at 204 a monitored operation of the system comprising the logic arrangement of the preferred embodiment is performed. At 206, a test determines whether a peak has been detected. If not, normal monitored operation continues at 204. If a peak has been detected, at 208, a peak leadup pattern or signature is created and stored. The term "signature" is known in the art to express the idea of a pattern of data that is characteristic of some particular event or set of circumstances. This peak leadup pattern or signature represents the events that may in future be tested for to determine whether there are repeating patterns of peak workload that can be characterized for their predictive quality and acted upon in the future.

At 210, such a test is performed to determine if such a predictive peak leadup pattern or signature is occurring. If not, normal monitored operation continues at 204. If a predictive peak leadup pattern or signature is detected, the relevant data mapped by the virtual LUs involved is requested to be migrated to a faster storage device 212 and the migration is processed by the virtualization unit 106 in FIG. 1 at 214. At 216, the end of the peak is tested for, such that if the peak has not ended, processing continues at 214. If the peak is detected at 216 to have ended, the data may optionally be migrated back again at 218, thus reverting to the original mapping of real units to the virtual LUs involved. At 220, normal operation resumes and the logic arrangement terminates its processing at 222.

Thus, by observation of the I/O access patterns for the system, longer-term variations may be anticipated, and the placement of data rearranged in anticipation of the workload. This can require the use of storage virtualization technology, such as a storage virtualization apparatus, which uses existing SAN storage assets and represents the real units that they serve as virtual logical units (LUs). The mapping of the virtual to the real units is controlled by the storage virtualization apparatus, and may be changed dynamically, allowing the data for a given virtual LU to be moved to different real units while I/O access to the virtual LU is maintained. This data migration function is a prerequisite for one embodiment of the present invention.

It is a characteristic of such a virtualization solution that the wider the data for a given virtual LU is spread across a number of real units the greater the opportunity for the failure of an individual real unit to take the virtual LU off-line. Therefore it would not be ideal to spread every virtual LU across as many disks as possible at all times. Advantageously, therefore, one embodiment of the present invention may be arranged to revert, after the peak demand has ended, to the original distribution of data real storage units as mapped by the virtual LUs.

In order to achieve a performance advantage, it can be important that the granularity of the patterns being sought in the I/O accesses is commensurate with the migration capability of the virtualization system that is being instructed to perform migration. That is to say, there may be no benefit in anticipating a workload peak of, for example, 10 minutes, if it would take an hour to effect a more efficient placement of the data to cope with that peak.

Thus, one embodiment of the present invention:
1) Monitors access density (IOPs per LU) over time and logs this data in a suitable way to analyze trends.
2) Provides a means to identify peaks and to confirm that they repeat over some time interval.
3) When the workload pattern or signature that precedes such a long enough repetitive workload peak has been identified:
   a) At a suitable time prior to a repeat instance of such a peak, migrates the data onto alternative real units to improve performance;
   b) or, migrates the data from a small number of real units to a larger number of real units; and then
   c) Following the peak, migrates the data back to the original number of real units to free up disk resources, and to reduce the potential impact of a disk outage.
4) The operation of the preferred embodiment of the present invention can be set in a number of different modes:
   a) Where the ramp-down of the I/O workload is anticipated by a similar means as the initial ramp-up was anticipated, and the data is migrated back to its original placement in anticipation of the ramp-down.
   b) Where the ramp-down in workload is detected and following this the data is migrated back to its original placement.
   c) Where the data is only migrated back to its original placement by being displaced by some other data that is seeing a higher I/O demand.
   d) Where the migration of the data is controlled by some policy that takes account of the availability of, for example, space on faster real storage units.

It will be clear to one skilled in the art that the method of an embodiment of the present invention may suitably be implemented in a logic apparatus comprising logic means or a logic mechanism to perform the steps, acts, or parts of the method, and that such logic means or such a logic mechanism may include hardware components or firmware components.

It will be also appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer-readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A method for operating a storage network control apparatus operable to present virtualized storage to a host system and comprising:

monitoring I/O activity for virtual storage logical units over time;

identifying a repeating instance of peak I/O activity for a virtual storage logical unit over time and generating a predictive signature therefrom;

identifying an instance of the predictive signature;

after identifying the repeating instance of peak I/O activity, and prior to a recurrence of the repeating instance of peak I/O activity, migrating data mapped by the virtual storage logical unit across additional real storage units to improve the I/O performance of the virtual storage logical unit; and, after completion of the recurrence of the repeating instance of peak I/O activity, migrating the data mapped by the virtual storage logical unit back from the additional real storage units.

2. The method of claim 1, farther comprising maintaining a record of the types of workload patterns on virtual storage logical units that immediately precede a repeating instance of peak I/O activity.

3. The method of claim 1, wherein the additional real storage units are selected for fast performance.

4. The method of claim 1, further comprising maintaining a record of the types of workload patterns on virtual storage logical units that immediately precede the completion of a repeating instance of peak I/O activity.

5. The method of claim 4, wherein the data that had been migrated is migrated back to its original placement in anticipation of the completion of the recurrence of the repeating instance of peak I/O activity.

6. The method of claim 1, wherein the data that had been migrated is migrated back to its original placement following the completion of the recurrence of the repeating instance of peak I/O activity.

7. The method of claim 1, wherein following the completion of the workload peak the data that had been migrated is only migrated back to its original placement as a result of being displaced by other data that has a high workload peak.

8. The method of claim 1, wherein, following the completion of the recurrence of the repeating instance of peak I/O activity, the data that had been migrated is migrated back to its original placement based on a policy that is defined for the storage network control apparatus.

9. The method of claim 1, wherein, following the completion of the recurrence of the repeating instance of peak I/O activity, the data that had been migrated is migrated back to its original placement based on a policy that is defined for the complete storage network.

10. The method of claim 1, wherein, following the completion of the recurrence of the repeating instance of peak I/O activity, the data that had been migrated is migrated back to its original placement based on a policy that is defined for the host system.

11. The method of claim 1, wherein the storage network control apparatus comprises a storage area network virtualization controller.

* * * * *